United States Patent Office 3,244,645
Patented Apr. 5, 1966

3,244,645
METHOD OF MAKING CHELATED ORGANO-STANNOTITANOXANE POLYMERS
Hideyo H. Takimoto and John B. Rust, Los Angeles, Calif., assignors to Hughes Aircraft Company, Culver City, Calif., a corporation of Delaware
No Drawing. Filed Sept. 28, 1960, Ser. No. 58,912
11 Claims. (Cl. 260—2)

The present invention relates to stannotitanoxane polymers of outstanding thermal stability and to the process of making same. More specifically this invention relates to stannotitanoxane copolymers containing regularly ordered repeating units along the polymer chain in which alkyl or aryl substituents are attached to tin and chelating groups are attached to titanium.

Titanoxane polymers have been prepared in the prior art by the careful hydrolysis of titanium orthoesters to yield polymers having the structure

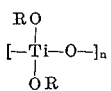

where the R groups are alkyl, aryl and the like. However, the RO groups attached to the titanium atom are labile and are subject to further hydrolysis to yield crosslinked materials, and finally the inorganic compound, titanium oxide, itself. In fact even during the careful hydrolysis step required to prepare the initial polymer, crosslinking occurs extensively because of the equivalent reactivity of each of the RO groups and of the randomness of the hydrolysis procedure. Other disclosures have been made on the hydrolysis of mixed esters, $$(RO)_2Ti(OR')_2$$

where R is a radial of a low boiling, easily hydrolyzable alcohol and R' is the radical of a high molecular weight, substantially hydrophobic alcohol group. In this way some measure of control over the hydrolysis is achieved. Still other disclosures have been made on titanoxane polymers in which the side groups attached to titanium were triorganosiloxy, triorganostannoxy or chelating groups. There also are disclosures on polymeric stannotitanoxanes containing triorganosiloxy and triorganostannoxy side groups.

Accordingly, it is an important object of this invention to provide resinous organo tin-titanium oxide copolymers of controlled structure and improved thermal stability.

Another object of this invention is to provide tin-titanium oxide copolymers having alkyl or aryl substituents attached to tin and chelating groups attached to titanium.

A further object of this invention is to provide a group of resinous compositions of controlled structure and molecular weight and reproducible thermal and mechanical properties.

Further objects and advantages of the invention will appear from the more detailed description set forth below, it being understood that this more detailed description is given by way of explanation and illustration only, and not by way of limitation. Various changes therein may be made by those skilled in the art without departing from the scope and spirit of the present invention.

The present invention is primarily concerned with our discovery that the grouping Sn-O-Ti can be secured by certain synthetic methods and the same grouping possesses great thermal stability. We have, furthermore, found that certain synthetic reactions lead to the formation of high polymers containing this Sn-O-Ti grouping. These high polymers are capable of being utilized in compositions which can be used for the fabrication of components. These components possess a range of usefulness in electronic parts in systems which must operate in unnatural environments such as high thermal flux.

The copolymers of the present invention can be prepared by several processes. In one method the side group of the already formed stannotitanoxane copolymers are replaced with chelating agents. Thus, the copolymers of the structures:

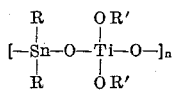

or

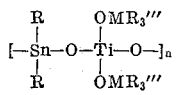

can be treated with chelating agents to form the organo tin-chelated titanium oxide copolymers:

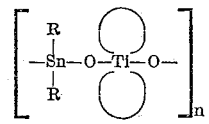

where R, R' and R''' represent an organo substituent, $n$ is a number greater than unity, M is a metal and

represents a chelating group such as those discussed hereinafter. An alternative and useful method involves the copolymerization of chelated titanium intermediates with suitable stannane derivatives to give resinous compositions of unequivocal structures. The stannane intermediates can be expressed by the general formula $R_nSn(OOCR'')_{4-n}$, where $n$ is the integer 1 or 2. The chelated intermediates can be represented by the following general formulas:

(a)
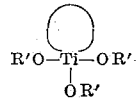

(b)
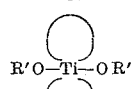

(c)
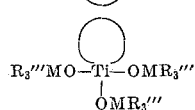

(d)
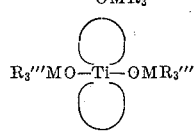

where M represents either a silicon or a tin atom and R, R' and R''' represents an alkyl, aryl, aralkyl, or alkaryl radical. Thus, R, R' and R''' can be methyl, ethyl, propyl, butyl, isopropyl, sec.-butyl, and the like; or benzyl, methyl benzyl, α-phenylethyl, β-phenylethyl, α-phenylpropyl, and the like. The chelating agent can be a β-diketone, such as acetylacetone, benzoylacetophenone, acetylacetophenone, propionylacetone, and the like; or a β-ketoester such as ethyl acetoacetate, propyl benzoylacetate, ethyl propionylacetate, diethyl malonate, and the like; or β-hydroxy or β-amino ketones and esters such as o-hydroxyacetophenone, o-hydroxypropiophenone, o-aminoacetophenone, ethyl glycinate, ethyl alanate, and the like; or compounds such as 8-quinolinol, o-hydroxybenzalimide, 1-aminoacridine, 1-hydroxyacridine, 2-picolinic acid, o-hydroxybenzaldehyde, trimethylene diamine and the like.

The ordered copolymers of tin and titanium oxide of the present invention can be prepared by utilizing the chelated titanium intermediates as illustrated schematically in the following reactions:

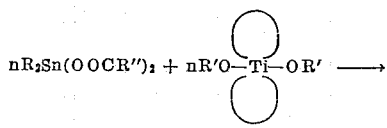

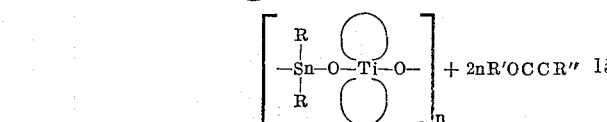

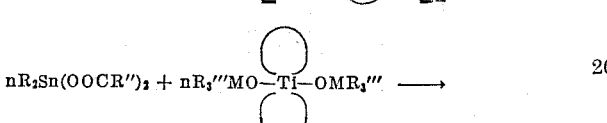

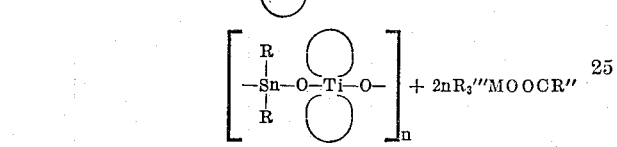

where R, R' and R" represent organo radicals. Radicals R', R" and R'" can be alkyl, aralkyl, or aryl. However, these groups preferably are of low molecular weight, having preferably less than about eight carbon atoms per group. In such cases, the ester eliminated during the reaction has sufficient volatility so that it can be removed by distillation at ambient, or reduced pressure. These groups can be methyl, ethyl, propyl, benzyl, phenyl and the like. These reactions have several variations which will become apparent from the more detailed description given hereinafter.

We have found that the above reaction always produces substantially regularly ordered tin-titanium copolymers. Thus, when conducted properly as will be described in the illustrative examples, a polymer chain containing the regularly ordered repeating units of Sn-O-Ti-O is produced. Under the reaction conditions used, $$R_2Sn(OOCR'')_2$$

does not react with similar molecules to yield Sn-O-Sn-O units and

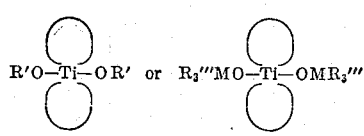

do not substantially react with similar molecules to introduce Ti-O-Ti-O units into the copolymers.

Specifically, the copolymers of the present invention can be prepared by one of several methods. When purified intermediates are used, copolymers of unequivocal structures are secured. When unpurified intermediates are employed, copolymers whose structures are the average over the postulated structures are obtained. The following reactions typify the methods of preparation with intermediates designated above as a, b, c, and d.

I

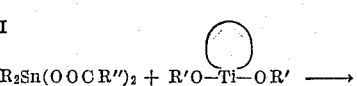

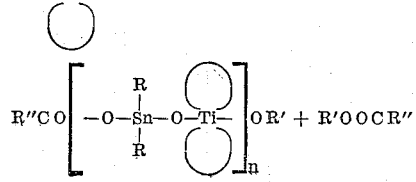

II

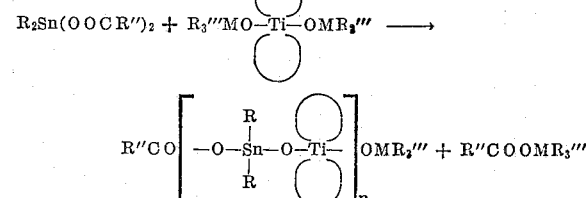

III

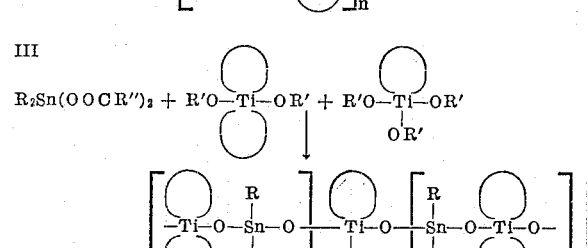

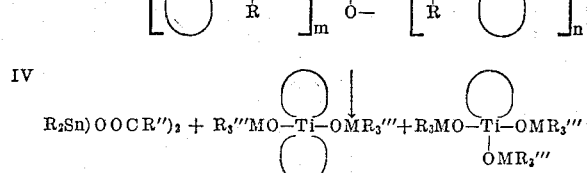

IV

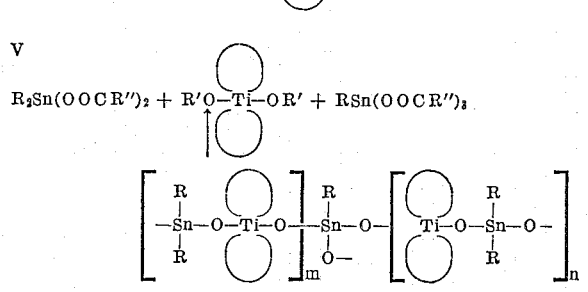

V

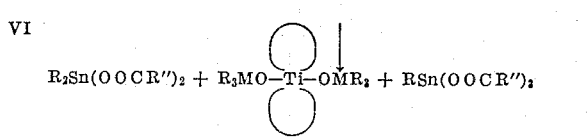

VI $$R_2Sn(OOCR'')_2 + R_3MO-Ti-OMR_3 + RSn(OOCR'')_3$$

where $m$ and $n$ are numbers equal to one or more than one.

The copolymers of the present invention can be prepared with any desired molecular weight and form, depending upon the reaction conditions, stoichiometry, and character of the radical R attached to the tin atom and the nature of the chelating groups. In general, the initial polymers of this invention have the form of:

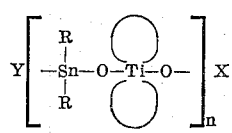

where X can be

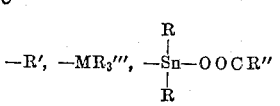

and Y can be

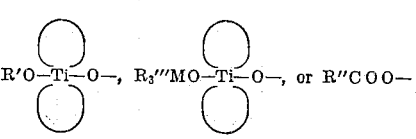

and where R, R' and R" can be any of the organo groups discussed above. In the above reactions I, III and V for the preparation of the polymers of this invention, it is also possible to use intermediates of the form:

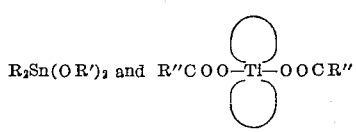

In order to produce copolymers of the present invention having the desired properties, it is desirable that the intermediates be in substantially pure form. The stannane derivatives can be synthesized and purified by any suitable means well-known to those skilled in the art. The chelated titanium compounds, we have found, are preferably prepared, for instance, according to the following illustrative reactions:

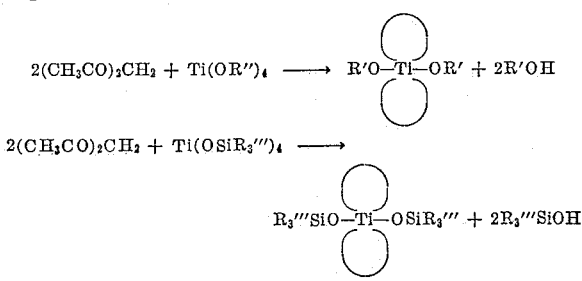

The reactions given immediately above are illustrated using acetylacetone as the chelating agent. However, any of the other chelating compounds mentioned earlier above can be used. The functionality of the chelated titanium intermediates can be controlled by the stoichiometry of the reaction. For best results, the reaction is carried out in an inert solvent such as carbon tertachloride, benzene, or cyclohexane.

The copolymers of the present invention can be polymerized further by hydrolysis of the end groups X and Y of the polymers illustrated above. A typical and possible structure for the hydrolytically polymerized materials is illustrated by the following reaction:

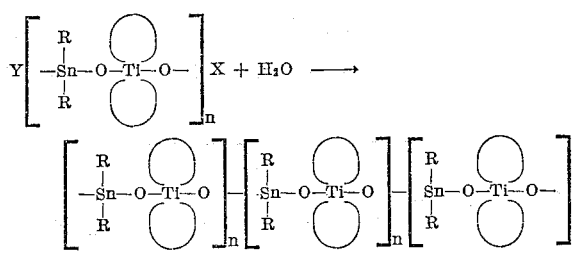

The products of this invention which contain reactive end groups can be used to great advantage to prepare modifications of a variety of resinous materials of enhanced thermal properties, mechanical strength at elevated temperatures, weathering resistance, and the like. The reactive end groups of our polymers are capable of reacting with alcohol and acid groups on reinous products such as alkyd resins, with phenolic hydroxyl groups, with esters to undergo ester interchange, with drying oil fatty acids, with silicone hydroxyl groups, with amine groups, and epoxy groups as well as many other reactive sites on other polymer molecules. By reacting with these resinous compositions, the polymers of this invention become a chemical part of the resinous composition, and thus impart desirable and unique properties to these modified compositions.

The polymers of the present invention can be used alone or in admixture with fillers and reinforcing agents, the proper choice of which depends upon the end use of the composition. As fillers there can be used glass fibers, clays, pigments, such as iron oxide, litharge, etc. Although the compositions of this invention can be advanced or cured by the application of heat, catalysts can be employed such as metallic salts of carboxylic acids, quaternary ammonium salts of carboxylic acids, metallic oxides, amines, organic peroxides, and the like.

The following examples are given to illustrate the materials and processes of the present invention and include illustrative procedures for the preparation of intermediates useful in the synthesis of the polymers.

Example I

To 28.4 grams of tetraisopropoxytitanium dissolved in 150 ml. of cyclohexane, 44.8 grams of benzoylacetouhenone in 300 ml. of cyclohexane was added. The addition of the β-diketone caused the mixture to turn bright yellow, and a precipitation of a yellow solid was observed. This solid dissolved upon heating, and refluxing was continued for 45 minutes. The yellow solid which again appeared on cooling was separated by filtration. The product, diisopropoxytitanium bis(benzoylacetophenonate), weighed 57.3 grams and melted at 170–175° C.

Example II

To 40.4 grams of tetrakis-(trimethylsiloxy)titanium dissolved in 150 ml. of cyclohexane, 29.0 grams of 8-hydroxyquinoline in 300 ml. of cyclohexane was added. The reaction mixture immediately became bright yellow. Approximately ten minutes after the addition was completed, a bright yellow solid precipitated out of the reaction mixture. This solid dissolved upon heating and the solution was refluxed for 20 minutes. Upon cooling to room temperature, the yellow solid again precipitated. The mixture was filtered in a Büchner funnel and dried under a vacuum. The product, bis-(trimethylsiloxy)titanium bis-(8-quinolinolate), melted at 145–148° C. and amounted to 46.9 grams.

Example III

An equimolar quantity of di-n-butyldiacetoxystannane was added to diisopropoxytitanium bis-(benzoylacetophenonate) of Example I. The mixture was heated carefully to give an amber melt. A volatile material was observed to be refluxing on the wall of the reaction vessel and the odor of isopropyl acetate was detected. The organic ester was removed by heating under vacuum to yield a very viscous amber fluid. This copolymer which was soluble in benzene and toluene could be further polymerized by heating in air to a hard, tough polymer.

Example IV

To 22.4 grams of triisopropoxytitanium benzoylacetophenonate was added 26.3 grams of dibutyldiacetoxystannane. The reaction mixture initially was an amber solution, but on further heating, a yellow solid precipitated. The volatile material, isopropyl acetate, was removed leaving behind a yellow solid which was only partially soluble in aromatic solvent. This resulting material was a stannotitanoxane polymer, having a substantial amount of crosslinking in the polymer chain.

Example V

To one mole of bis(trimethylsiloxy)titanium bis(8-quinolinolate) of Example II was added one mole of dibutyldiacetoxystannane. The reaction mixture was carefully heated to form an orange melt. The temperature was increased slowly to avoid excessive heating. The orange melt turned amber and finally red-brown. Heating was continued for several hours and then the volatile material was removed. Upon cooling to room temperature a very viscous brown material was formed. This material was readily soluble in common organic solvents. Prolonged heating in air at elevated temperature effected further cure and the copolymer became insoluble.

Example VI

To one mole of tetraisopropoxytitanium was added slowly with stirring one mole of dibutyldiacetoxystannane. The addition generated heat and the odor of isopropyl acetate was detected. The clear solution turned pale yellow. The solution was refluxed for two hours after which two moles of acetylacetone was added. Further heating changed the color of the solution to dark amber. The volatile products were removed by heating under vacuum. The residual material was a dark brown fluid which could be cast into a film upon heating at moderate temperature.

What is claimed is:

1. A process for the production of an organo-tin-chelated titanium oxide polymer comprising reacting, by organic ester elimination under substantially anhydrous conditions, approximately equimolar amounts of an organo acyloxy stannane having the general formula $R_nSn(OOCR')_{4-n}$ with a dialkoxy titanium dichelate having the general formula

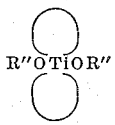

wherein R is a hydrocarbon radical selected from the class consisting of alkyl, aryl, aralkyl and alkaryl, R' and R'' are hydrocarbon alkyl radicals, the symbol ◯ stands for a chelate group selected from the class consisting of beta-diketones, beta-hydroxyketones, beta-aminoketones, beta-ketoesters and beta-hydroxyamines, and $n$ is an integer in the range from 1 to 2 inclusive.

2. A process for the production of an organo-tin-chelated titanium oxide polymer comprising reacting, by organic ester elimination under substantially anhydrous conditions, approximately equimolar amounts of an organo acyloxy stannane having the general formula $R_nSn(OOCR')_{4-n}$ with a dialkoxy titanium dichelate having the general formula

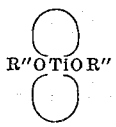

wherein R, R', and R'' are hydrocarbon alkyl radicals, the symbol ◯ stands for a chelate group selected from the class consisting of beta-diketones, beta-hydroxyketones, beta-aminoketones, beta-ketoesters and beta-hydroxyamines, and $n$ is an integer in range from 1 to 2 inclusive.

3. A process for the production of an organo-tin-chelated titanium oxide polymer comprising reacting, by organic ester elimination under substantially anhydrous conditions, approximately equimolar amounts of an organo acyloxy stannane having the general formula $R_nSn(OOCR')_{4-n}$ with a dialkoxy titanium dichelate having the general formula

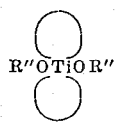

wherein R is a hydrocarbon aryl radical, R' and R'' are hydrocarbon alkyl radicals, the symbol ◯ stands for a chelate group selected from the class consisting of beta-diketones, beta-hydroxyketones, beta-aminoketones, beta-ketoesters, and beta-hydroxyamines, and $n$ is an integer in the range from 1 to 2 inclusive.

4. A process according to claim 1, wherein R is a hydrocarbon alkyl radical.

5. A process according to claim 1, wherein R is a hydrocarbon aryl radical.

6. A process according to claim 1, wherein R is a hydrocarbon aralkyl radical.

7. A process according to claim 1, wherein R is a hydrocarbon alkaryl radical.

8. A process for the production of an organo-tin-chelated titanium oxide polymer comprising reacting, by isopropyl acetate elimination under substantially anhydrous conditions, approximately equimolar amounts of di-n-butyldiacetoxystannane with diisopropoxytitanium bis (benzoylacetophenonate).

9. A process for the production of an organo-tin-chelated titanium oxide polymer comprising reacting, by isopropyl acetate elimination under substantially anhydrous conditions, approximately equimolar amounts of dibutyldiacetoxystannane with triisopropoxytitanium benzoylacetophenonate.

10. A process for the production of an organo-tin-chelated titanium oxide polymer comprising reacting, by trimethylacetoxysilane elimination under substantially anhydrous conditions, approximately equimolar amounts of dibutyldiacetoxystannane with bis(trimethylsiloxy)titanium bis(8-quinolinolate).

11. A process for the production of an organo-tin-chelated titanium oxide polymer comprising reacting, by isopropyl acetate elimination under substantially anhydrous conditions, approximately equimolar amounts of dibutyldiacetoxystannane with tetraisopropoxytitanium followed by reaction with acetylacetone.

References Cited by the Examiner

UNITED STATES PATENTS

| | | | |
|---|---|---|---|
| 2,643,262 | 6/1953 | Bostwick | 260—2 |
| 2,998,407 | 8/1961 | Foster et al. | 260—2 |

WILLIAM H. SHORT, *Primary Examiner.*

MILTON STERMAN, JOSEPH L. SCHOFER, JOSEPH R. LIBERMAN, *Examiners.*

H. D. ANDERSON, *Assistant Examiner.*